(12) United States Patent
Hall (10) Patent No.: US 9,104,027 B2
(45) Date of Patent: Aug. 11, 2015

(54) OPTICAL INSTRUMENT FOR THE SIMULATION OF ATMOSPHERIC TURBULENCE

(71) Applicant: Manufacturing Techniques, Inc., Kilmarnock, VA (US)

(72) Inventor: John M. Hall, Stafford, VA (US)

(73) Assignee: Manufacturing Techniques, Inc., Kilmarnock, VA (US)

( * ) Notice: Subject to any disclaimer, the term of this patent is extended or adjusted under 35 U.S.C. 154(b) by 127 days.

(21) Appl. No.: 13/827,202

(22) Filed: Mar. 14, 2013

(65) Prior Publication Data

US 2013/0286401 A1    Oct. 31, 2013

Related U.S. Application Data

(60) Provisional application No. 61/639,154, filed on Apr. 27, 2012.

(51) Int. Cl.
| | |
|---|---|
| *G01B 11/02* | (2006.01) |
| *G02B 26/06* | (2006.01) |
| *G01B 9/02* | (2006.01) |
| *G02B 27/00* | (2006.01) |

(52) U.S. Cl.
CPC ............ *G02B 26/06* (2013.01); *G01B 9/02034* (2013.01); *G02B 27/0025* (2013.01)

(58) Field of Classification Search
CPC ............... G02B 26/06; G02B 27/0025; G02B 27/0068; G01B 9/02034–9/02039
USPC .......................... 359/486.01, 486.03; 356/515
See application file for complete search history.

(56) References Cited

U.S. PATENT DOCUMENTS

| | | |
|---|---|---|
| 5,663,832 A | 9/1997 | Miller et al. |
| 5,756,990 A | 5/1998 | Watkins et al. |
| 5,841,911 A | 11/1998 | Kopeika et al. |
| 6,027,447 A | 2/2000 | Li |
| 6,184,816 B1 | 2/2001 | Zheng et al. |
| 6,496,252 B1 | 12/2002 | Whiteley |
| 6,512,999 B1 | 1/2003 | Dimas et al. |
| 6,563,452 B1 | 5/2003 | Zheng et al. |
| 7,098,871 B1 | 8/2006 | Tegreene et al. |
| 7,260,251 B2 | 8/2007 | Dowski, Jr. et al. |
| 7,319,783 B2 | 1/2008 | Dowski, Jr. et al. |
| 7,428,093 B2 | 9/2008 | Tegreene et al. |
| 7,450,745 B2 | 11/2008 | Dowski, Jr. et al. |
| 7,889,903 B2 | 2/2011 | Dowski, Jr. et al. |

(Continued)

*Primary Examiner* — Michael A Lyons
*Assistant Examiner* — Violeta A Prieto
(74) *Attorney, Agent, or Firm* — The Webb Law Firm (57) ABSTRACT

Provided herein is an optical turbulence device configured for insertion between the target collimator and the sensor unit being tested, which simulates a turbulence effect. The turbulence device for imparting wavefront aberrations to a projected radiation beam includes an optical phase element for altering the optical phase of a radiation beam. The optical phase element includes a plurality of active areas disposed on a surface of the phase element. The plurality of active areas includes a plurality of variations for imparting wavefront aberrations to a radiation beam, thereby altering optical phase of the beam. The device further includes a driving mechanism coupled to the optical phase element for transitioning the optical phase element between a plurality of positions, thereby exposing a different active area of the optical phase element to the radiation beam. The optical phase element is configured to be positioned at an intermediate focal plane of an inverting a focal optical assembly.

18 Claims, 3 Drawing Sheets

(56) References Cited

U.S. PATENT DOCUMENTS

| | | |
|---|---|---|
| 7,957,608 B2 | 6/2011 | Miller et al. |
| 8,094,960 B2 | 1/2012 | Riley et al. |
| 8,107,705 B2 | 1/2012 | Dowski, Jr. et al. |
| 2004/0190915 A1* | 9/2004 | Murray et al. ................ 398/212 |
| 2005/0151961 A1 | 7/2005 | McGraw et al. |
| 2006/0147176 A1* | 7/2006 | Takamatsu et al. ........... 385/147 |
| 2007/0077071 A1 | 4/2007 | Belenkiy |
| 2007/0273865 A1* | 11/2007 | Niitsu et al. .................... 356/33 |
| 2008/0136742 A1 | 6/2008 | Tegreene et al. |
| 2010/0192709 A1 | 8/2010 | Wilcox et al. |
| 2013/0201542 A1* | 8/2013 | Wilcox et al. ................. 359/238 |

* cited by examiner

OPTICAL INSTRUMENT FOR THE SIMULATION OF ATMOSPHERIC TURBULENCE

CROSS REFERENCE TO RELATED APPLICATIONS

This application claims the benefit of U.S. Provisional Patent Application No. 61/639,154 entitled "Optical Instrument for the Simulation of Atmospheric Turbulence" filed Apr. 27, 2012, which is hereby incorporated by reference in its entirety.

BACKGROUND OF THE INVENTION

1. Field of the Invention

The present invention is generally directed to an optical device and assembly, which provides an optical simulation of the aberrational effects of atmospheric turbulence and, more particularly, to an optical device which can be inserted into an existing optical lab collimator test facility.

2. Description of Related Art

Evaluating the effect of atmospheric turbulence on a sensor in a laboratory setting is often difficult. A typical instrumentation facility will include a set of targets located at the focal plane of a collimating optical system. The optical sensor unit being tested is normally positioned with its aperture receiving light from the target collimator. In this configuration, measurements of the sensor can be made. The simulation of atmospheric turbulence in such a system, however, would require a random variation in the focal quality of the target. Such random variation is difficult to create given that the target must be located in the focal plane of the collimator.

A number of different techniques have been used to simulate atmospheric image turbulence in laboratory settings. For example, some known systems utilize spatial light modulators (SLM) to impart a temporally varying phase. For example, U.S. Patent Appl. Pub. No. 2010/0192709 to Wilcox, et al. discloses a system including a time varying phase screen input in a liquid crystal spatial light modulator. The liquid crystal spatial light modulator receives a collimated beam from a light source such as a laser, and impresses an aberration on the wavefront of the collimated beam from the laser. The aberration that is impressed on the collimated beam by the spatial light modulator is generated by the atmospheric turbulence generator. However, such systems are limited to use in the visible wavelength regions in which liquid crystal modulators operate. Furthermore, the structure of the spatial light modulator creates a permanent wavefront deformation, which cannot be removed from the system.

Methods of approximating atmospheric turbulence are also known for use with an infrared imaging apparatus. For example, U.S. Pat. No. 5,756,990, to Watkins et al. is directed to a method for approximating effects of atmospheric turbulence on an infrared imaging apparatus. The system obtains a sampled version of an object and applies at least one spatially varying system to obtain an image intensity distribution. The spatially varying system simulates atmospheric turbulence that varies in phase and amplitude as a function of the spatial index. This system is limited to infrared imagery and is not configured for use in an optical laboratory system.

Alternatively, computer based modeling systems are used to approximate turbulence in optical systems. For example, U.S. Pat. No. 6,512,999, to Dimas et al., discloses an apparatus and method for simulating atmospheric turbulence using a computer-aided modeling system. In Dimas, turbulent flow of a fluid, relative to an object, is simulated by layering a plurality of vortex sheet layers surrounding the surfaces of a modeled object. The apparatus tracks vortex tubes growing out of an outermost layer of the plurality of vortex sheet layers, and projects the layered vortex sheets and the vortex tubes on the object.

Still other methods of simulating atmospheric turbulence require a target which is integrated into the device and projected to the tested lens. In this type of system, only the provided target can be used. The system cannot be integrated and calibrated into an existing optical laboratory system.

Many of the above-described methods cannot be used with existing optical laboratory systems. Therefore, there is a need for an optical instrument that can be easily inserted into an existing optical laboratory system, and which makes no further changes to the existing system other than providing a simulated atmospheric turbulence effect. In this way, calibration testing of non-turbulence and turbulence infused targets could be accomplished in a common system. The optical instrument of the present invention is configured to provide such beneficial results.

SUMMARY OF THE INVENTION

Provided herein is an optical device configured for insertion between a target collimator and the sensor unit being tested of an existing test facility, which simulates the turbulence effect. According to one embodiment, an optical turbulence device for imparting wavefront aberrations to a projected radiation beam includes an optical phase element for altering the optical phase of a radiation beam. The optical phase element includes a plurality of active areas disposed on a surface of the phase element. The plurality of active areas includes a plurality of variations for imparting wavefront aberrations to a radiation beam, thereby altering optical phase of the beam. The device further includes a driving mechanism coupled to the optical phase element for transitioning the optical phase element between a plurality of positions, thereby exposing a different active area of the optical phase element to the radiation beam. The optical phase element is configured to be positioned at an intermediate focal plane of an afocal inverter.

According to another embodiment of the invention, a collimator testing assembly includes a collimator for providing a radiation beam and an afocal inverter, including an entrance optic, which receives the radiation beam from the collimator, and an exit optic. The entrance optic and the exit optic are arranged to focus the radiation beam to an intermediate focal plane. The assembly further includes a turbulence device including an optical phase element for altering the optical phase of the radiation beam. The optical phase element includes a plurality of active areas disposed on a surface of the phase element. The plurality of active areas includes a plurality of variations for imparting wavefront aberrations to a radiation beam, thereby altering optical phase of the beam. The turbulence device further includes a driving mechanism coupled to the optical phase element for transitioning the optical phase element between a plurality of positions, thereby exposing a different active area of the optical phase element to the radiation beam. The optical phase element is configured to be positioned at an intermediate focal plane defined by the afocal inverter. The testing assembly further includes a sensor unit which receives the radiation beam from the exit optic for testing the sensor unit.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

DESCRIPTION OF THE PREFERRED EMBODIMENTS

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

The present invention is drawn to an optical device and assembly for simulating atmospheric turbulence by varying optical phase of a radiation beam. The optical device is designed to be used with an existing optical lab collimator test facility in order to simulate the aberrational effects of atmospheric turbulence. An optical collimator test facility may be used to obtain calibration data and performance characterization data for a variety of sensors, including optical sensors, infrared sensors, ultraviolet sensors, and the like, by measuring the spectral, absolute, or cosine responses of such sensors, when exposed to a radiation beam. Such sensor units are used to measure visual aspects of the target image such as color, hue, color saturation, and similar characteristics.

Testing an optical sensor in conditions mimicking atmospheric conditions can be used to interpret how a sensor will function in use, particularly, for sensors used for aeronautic applications, or other applications in which atmospheric conditions are likely to degrade image quality. As will be described in greater detail herein, such a test facility will generally include a collimator or lamp for providing a light beam, various optical elements, including lens, and mirrors, for focusing the light beam, and a sensor unit housing the sensor to be tested. The facility may also include a plurality of electrical components including photosensors, data collection sensors, as well as, data analysis hardware and software, and digital data recording and storage devices, as is known in the art, to collect and analyze relevant data obtained from the sensor being tested.

Figure 1:
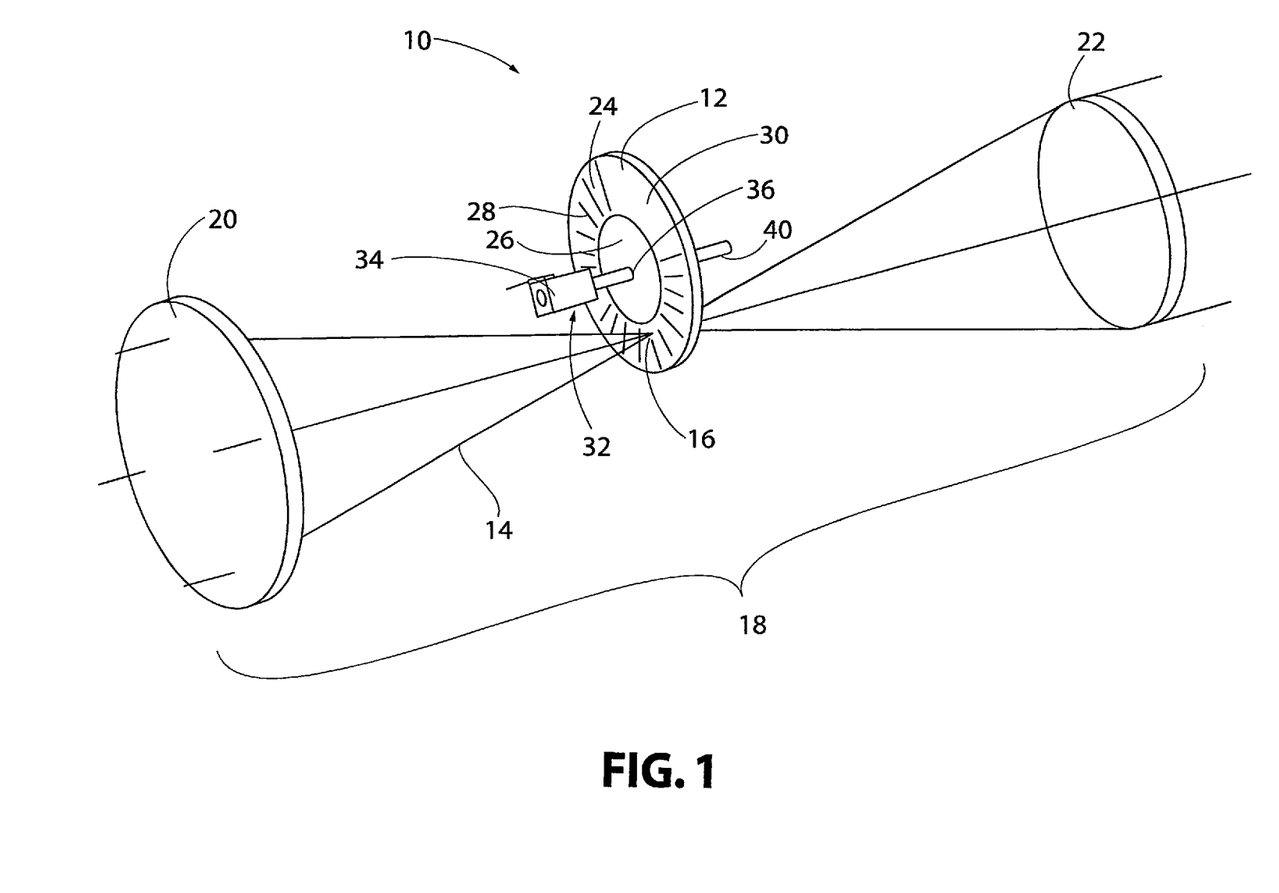
FIG. 1 is a schematic drawing of a turbulence simulation device in accordance with an embodiment of the invention.
Figure 2:
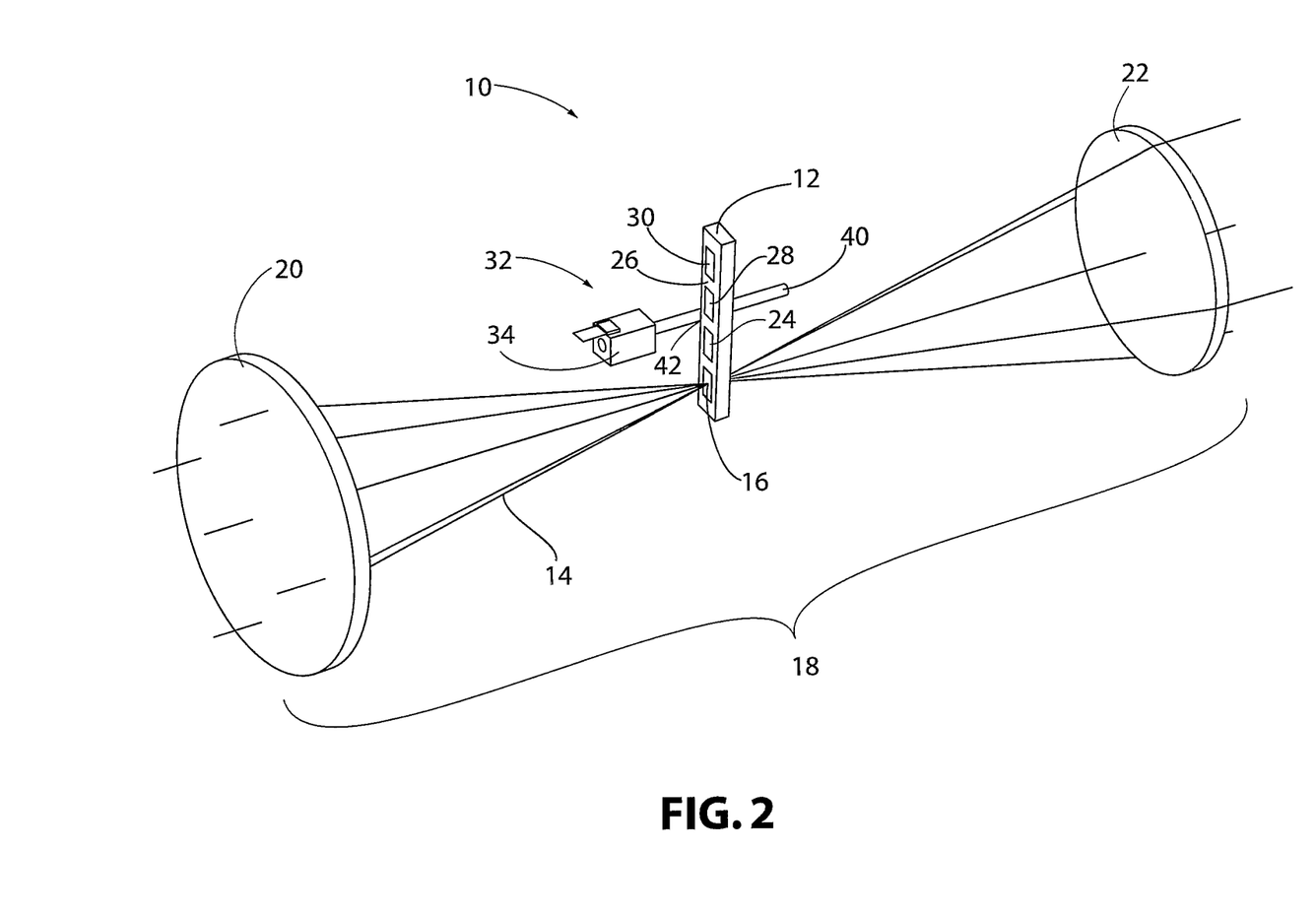
FIG. 2 is a schematic drawing of a turbulence simulation device, according to a further embodiment of the invention; and, FIG. 3 is a schematic drawing of an optical turbulence simulation assembly, according to an embodiment of the invention.

With reference to FIGS. 1 and 2, an optical turbulence device 10 includes a movable optical phase element 12. The optical phase element 12 is configured to impart wavefront aberrations to a radiation beam 14 to alter the optical phase of the radiation beam 14, for the purpose of simulating atmospheric turbulence. In certain embodiments, the optical phase element 12 is configured to be positioned at an intermediate focus 16 of an afocal inverter 18, or inverting afocal assembly. As is shown in FIGS. 1 and 2, the afocal inverter 18 includes entrance optics 20 and exit optics 22 for focusing the radiation beam 14 at an intermediate focus 16. In this configuration, the radiation beam 14 can be focused on a relatively small section of the optical phase element 12, meaning that optical phase may be modified across the entire radiation beam 14 using only a small distortion area.

The optical phase element 12 includes one or more active areas 24 disposed on a proximal surface 26 of the optical phase element 12. The active areas 24 include variations 28 for altering the optical phase of a radiation beam 14. The depth of the variations 28 determines the significance of the phase change of the radiation beam 14, thereby controlling the intensity of the turbulence aberration. The variations 28 may be created, formed, or manufactured by various techniques, including single-point diamond turning using a slow-tool servo feed, molding, hand-polishing, magnetorhelogical finishing, or others, as are known in the art, for making non-spherical optical surfaces. The variations 28 may be arranged to form a continuous pattern across the surface 26 of the phase element 12, producing periodic differences in optical phase. Alternatively, the variations 28 may be positioned in a less organized pattern to produce random phase differences. In one non-limiting embodiment, the optical phase element 12 further includes a reference calibration region 30. The reference calibration region 30 is an essentially "flat" region having few variations 28 and, as a result, very low optical wavefront distortion. The calibration region 30 can be used to obtain baseline or calibration data for the sensor being tested, which can be compared to measurements obtained once simulated turbulence is applied.

The optical phase element 12 is formed from a material which is transmissive for the wavelength of light of the radiation beam 14 being used, and may include a number of structural materials, including plastics, polymers, metals, or ceramics, as are known in the art. More particularly, for infrared applications, in which the radiation beam 14 has a wavelength from about 3 μm to about 12 μm, the optical phase element 12 is preferably formed from materials including crystalline materials, such as Germanium, Zinc Selenide, Zinc Sulphide, or Gallium Arsenide, or amorphous materials, such as $Ge_{33}As_{12}Se_{55}$ (commonly referred to as Amorphous Material Transmitting Infrared Radiation or AMTIR-1) and $Ge_{20}Sb_{15}Se_{65}$ (commonly referred to as GASIR-2). For visible and infrared systems operating from the visible spectrum (e.g. about 390 nm to 700 nm) up to about 2 microns wavelength, plastics such as acrylic, polystyrene, and polycarbonate may be used. The optical phase element 12 may be manufactured by any suitable manufacturing technique including, but not limited to, polishing, molding, plastic warping, or single-point diamond turning. The optical phase element 12 can be any suitable shape which fits easily within an existing test facility and which, in certain embodiments, can be easily transitioned from one position to another to modify phase output. In one preferred non-limiting embodiment, the optical phase element 12 is a rotary wheel.

In certain non-limiting embodiments, the optical phase element 12 is moveable for the purpose of exposing the radiation beam to different areas and/or variations of the optical phase element 12. Transitioning the optical phase element 12 between a plurality of positions provides a time-varying aspect of turbulence on the projected image. Varying the rotation speed alters the time-dependent aspect of the turbulence. To permit easy movement of the phase element 12, the optical phase element 12 may be coupled to a driving mechanism 32. The driving mechanism 32 may be any mechanical or electronic mechanism for altering the orientation of the optical element 12 to change which portion of the active area of the optical element 12 is exposed to the radiation beam 14. In one non-limiting embodiment, the driving mechanism 32 is an electronic motor 34. However, other driving mechanisms 32 such as mechanical sliding or spinning mechanisms or mechanisms for manually advancing the phase element 12 may also be used within the scope of the present disclosure.

With reference to FIG. 1 and in one non-limiting embodiment, the optical phase element 12 is a rotating wheel driven by an electric motor 34. As shown in FIG. 1, the optical phase element 12 includes a central opening 36. The electric motor 34 rotates a shaft 40 inserted through and engaged to the central opening 36 of the optical phase element 12. Rotation of the shaft 40 causes the optical phase element 12 to rotate, thereby transitioning the optical phase element 12 to different positions. Transitioning the optical phase element 12 to different positions exposes the radiation beam 14 to different areas of the optical phase element 12.

With reference to FIG. 2, in a further non-limiting embodiment, a turbulence simulation device 10, including a non-rotational optical phase element 12, is depicted. In this embodiment, the optical phase element 12 includes active areas 24 arranged in a generally linear configuration. The optical phase element 12 is coupled to a driving mechanism 32, such as a motor 34, which functions as a linear slider for sliding the optical phase element 12 in a transverse direction, with respect to the radiation beam 14. The motor 34 may include a rotatable shaft 40 engaged to a follower 42 or worm, disposed on the optical phase element 12. In this configuration, rotation of the shaft 40, by the motor 34, advances the optical phase element 12, thereby exposing different active areas 24 to the radiation beam 14.

Figure 3:
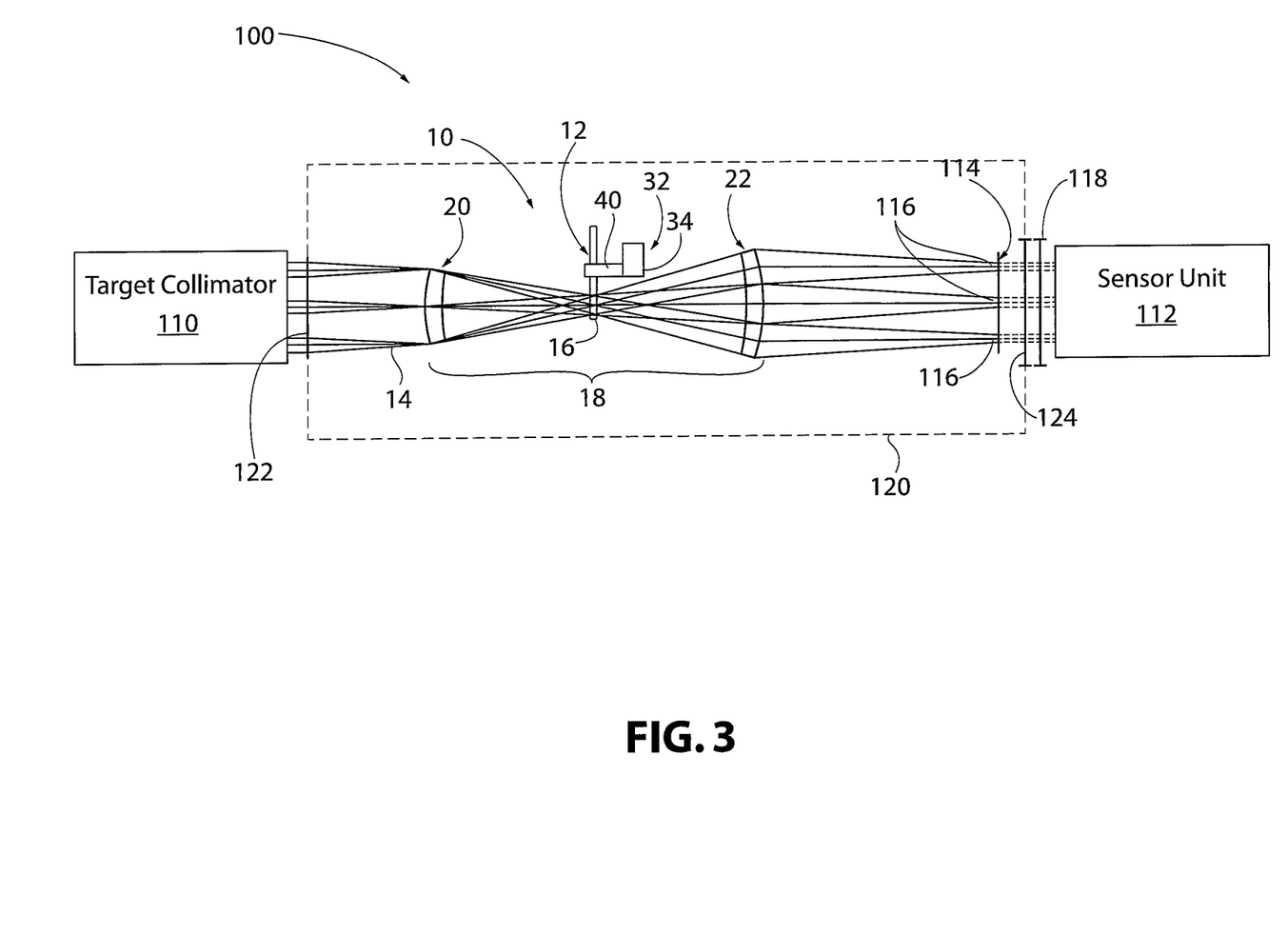

With reference to FIG. 3, in a further non-limiting embodiment, the turbulence simulation device 10 is configured to be inserted in an existing optical laboratory testing facility to form an optical turbulence simulation assembly 100. The assembly 100 includes a target collimator 110 for providing a radiation beam 14 for testing. There are many custom and commercial types of collimators 110 which are typically used in optical test laboratories. Commercially available collimators 110 that may be used with the invented assembly 100 are available from vendors including, but not limited to, Santa Barbara Infrared, CI Systems, Wells Research, and Electro-Optic Industries (EOI). These collimators 110 all feature a precision target plate, which is collimated by an optical element which is typically an off-axis parabola.

The radiation beam 14, provided by the target collimator 110, includes a target image, which is modified by the optical turbulence device 10 before being read by a sensor unit 112 to be tested. The provided radiation beam 14 may be in the near or far infrared, visible, or ultraviolet spectrums, and may have a wavelength between about 0.3 μm and 12.0 μm. As will be described herein, it is noted that the construction of the turbulence simulation device 10, including the shape and materials used, for the entrance and exit optics, optical phase element, and sensor unit are generally chosen to complement the wavelength of radiation provided by the collimator 110.

The assembly 100 further includes an afocal inverter 18 formed from entrance optics 20 and exit optics 22 arranged to converge the radiation beam 14 at the intermediate focal plane 16 disposed between the optics 20, 22. The optics 20, 22 may be one or more concave lens, as is known in the art. The lens may be formed as singlets, doublets, or other combinations capable of providing a focused and high quality image.

The assembly 100 further includes an optical phase element 12 disposed at the intermediate focal plane 16 defined by the entrance and exit optics 20, 22. As described above in connection with embodiments of the turbulence simulation device, the optical phase element 12 includes active areas 24 formed by variations 28 disposed on the proximal surface 26 of the phase element 12. The variations 28 are responsible for altering the optical phase of the radiation beam 14, as it passes through the phase element 12. Also as described above, the optical phase element 12 is moveable, permitting exposure of different active areas 24 to the radiation beam 14. The optical phase element 12 may be any suitable shape, such as a rotary wheel or linear slider. The optical phase element 12 may be rotated or moved using a driving element 32 such as a motor 34.

After the radiation beam 14 passes through and is modified by the optical phase element 12, the radiation beam 14 is directed though the exit optics 22. From the exit optics 22, the beam 14 is directed towards an external pupil 114. The radiation beam 14 converges at the external pupil 114 and is then conveyed through an entrance aperture 118 of the sensor unit 112. As is shown in FIG. 3, the external pupil 114 effectively converges portions of the radiation beam 14 to form bundles 116, which are provided to the sensor unit 112. It is important that the pupil 114 converges all, or almost all, of the radiation beam 14 so that sensor unit 112 is exposed to the entire radiation beam 14 (i.e. across the entire field of view). Exposing the sensor unit 112 to the entire radiation beam 14 ensures that the sensor unit 112 is exposed to the entire range of simulated turbulence. Therefore, in a preferred non-limiting embodiment, the diameter of the exit pupil 114 is matched or oversized to an entrance aperture 118 of the sensor unit 112 under test. In this case, the assembly 100 and optical turbulence device 10 are able to project the turbulence effect over all, or almost all, of the field of view of the sensor unit 112 being tested. More specifically, the pupil 114 serves to bring together all facets of the radiation beam 14 provided by the collimator 110, so that the entire beam is exposed to a sensor unit 112.

In a preferred non-limiting embodiment, the assembly further includes an exterior housing 120 for enclosing the testing structure. The housing may be a generally rectangular enclosure formed from a suitable structural material. The housing 120 may include entrance 122 and exit apertures 124 for permitting the radiation beam 14 to enter and exit the housing 120. In certain embodiments of the housing 120, the optics themselves (e.g. entrance optics 20 and exit optics 22) may be maintained in a precise orientation, relative to each other, by a machined "optical bench" skeletal structure for positioning the optics. The housing 120 may be configured to attach to the optical bench or other suitable retention structure. Standard machining practices may be used to produce the housing 120 and/or bench components. Beneficially, the housing 120 prevents a user from accidently contacting or contaminating the optical components of the assembly 100. It is further noted, that the assembly 100 can be a stand alone structure, intended to be permanently installed in a research facility or similar location. Alternatively, the assembly 100 can be placed on a moving conveyance, such as wheels, to facilitate use in a multi-purpose lab facility.

Having described the structure of the turbulence simulation device 10 and assembly 100, methods of using the device 10 and assembly 100 will now be described. In use, an operator configures a test collimator 110 to provide the radiation beam 14. The radiation beam 14 is focused to the intermediate focal plane 16 through the afocal inverter 18. More particularly, the radiation beam 14 enters the afocal inverter 16 through the entrance optic 20 and is deflected toward the intermediate focal plane 16. The optical phase element 12 is positioned at the intermediate focal plane 16, defined by the entrance and exit optics 20, 22. As described above, the optical phase element 12 imparts wavefront abberations to the radiation beam 14, thereby altering the optical phase of the beam 14, simulating turbulence. The operator may alter the frequency or time-dependence of the radiation beam 14 by changing the position of the phase element 12. For example, in certain embodiments, the operator may engage the motor 34 causing the phase element 12 to rotate. The rotation speed determines the degree of time dependence of the simulated turbulence. Additionally, the operator may alter the wavefront aberration and simulated turbulence by removing and replacing the phase element 12.

The modified radiation beam 14 exits the afocal inverter 18 through exit optics 22. From the exit optics 22, the radiation beam 14 converges at the sensor unit 112. For example, the radiation beam 14 may be reflected through an aperture 118. The pupil 114 directs the radiation beam 14 to the sensor unit 112 through the aperture 118. As described above, preferably the exit pupil 114 is matched or oversized to the aperture 118 of the sensor unit 112, so that the sensor unit 112 observes simulated turbulence across the entire field of view of the sensor unit 112. The operator may adjust the configuration of the inverter 18 and sensor unit 112 to ensure that the pupil 114 and aperture 118 are correctly aligned. If necessary, the operator may replace the pupil 114 and/or aperture 118 to ensure proper alignment. Once the collimator 110, turbulence simulation device 10, and sensor unit 112 are correctly aligned, the operator can begin to collect calibration or physical characterization data regarding the sensor being tested. The operator may also obtain baseline or reference data for the sensor by rotating or moving the phase element 12 so that only the calibration region 30 is exposed to the radiation beam 14.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

The invention claimed is:

1. A turbulence simulation device for imparting wavefront aberrations to a radiation beam, the device comprising:
    an optical phase element for altering the optical phase of a radiation beam, the optical phase element comprising a plurality of active areas disposed on a surface of the phase element, the plurality of active areas comprising a plurality of variations for imparting wavefront aberrations to a radiation beam, thereby altering optical phase of the beam; and,
    a driving mechanism coupled to the optical phase element for transitioning the optical phase element between a plurality of positions, thereby exposing a different active area of the optical phase element to the radiation beam,
    wherein the optical phase element is configured to be positioned at an intermediate focal plane defined by an inverter,
    wherein the optical phase element imparts a range of simulated turbulence to the radiation beam, and
    wherein the plurality of variations of the plurality of active areas of the optical phase element provide random differences in optical phase of the radiation beam.

2. The device of claim 1, wherein the optical phase element is a disk shaped member having a circular cross section, in the transverse direction.

3. The device of claim 1, wherein the driving mechanism is a motor, configured to automatically transition the phase element between the plurality of positions so that different active areas of the phase element are exposed to the radiation beam.

4. The device of claim 3, wherein the optical phase element comprises an annular member having a central opening, and wherein the driving mechanism is a motor configured to rotate a shaft engaged to the central opening of the optical phase element, thereby rotating the optical phase element between the plurality of positions.

5. The device of claim 3, wherein the active areas of the optical phase element are arranged in a linear configuration, and wherein the driving mechanism is a linear slider configured to slide the optical phase element through the radiation beam, thereby exposing the beam to different active areas of the optical phase element.

6. The device of claim 1, wherein the afocal inverter is configured to magnify the radiation beam, which passes through the inverter.

7. The device of claim 1, wherein the optical phase element is removable from the driving mechanism and replaceable with an optical phase element having a different arrangement of active areas.

8. The device of claim 1, wherein the optical phase element further comprises a reference calibration area having low optical distortion.

9. The device of claim 1, wherein the radiation beam is in a visible wavelength, a near infrared wavelength, or an infrared wavelength.

10. The device of claim 9, wherein the optical phase element is formed from a material which is transmissive to the wavelength of the radiation beam.

11. A collimator testing assembly comprising:
    a collimator for providing a radiation beam;
    an inverter comprising an entrance optic, which receives the radiation beam from the collimator, and an exit optic, wherein the entrance optic and the exit optic are arranged to focus the radiation beam to an intermediate focal plane;
    a turbulence simulation device disposed at the intermediate focal plane between the entrance optic and the exit optic that imparts a range of simulated turbulence to the radiation beam; and,
    a sensor unit which receives the radiation beam across the range of simulated turbulence from the exit optic, for testing the sensor unit, wherein the range of simulated turbulence to the radiation beam is captured within a single frame of the sensor unit under test,
    wherein the turbulence simulation device comprises:
        an optical phase element for altering the optical phase of the radiation beam, the optical phase element comprising a plurality of active areas disposed on a surface of the phase element, the plurality of active areas comprising a plurality of variations for imparting wavefront aberrations to a radiation beam, thereby altering optical phase of the beam; and, a driving mechanism coupled to the optical phase element for transitioning the optical phase element between a plurality of positions, thereby exposing a different active area of the optical phase element to the radiation beam, wherein the optical phase element is configured to be positioned at an intermediate focal plane of the inverter.

12. The assembly of claim 11, wherein the optical phase element is a rotary wheel.

13. The assembly of claim 11, wherein the entrance optic and the exit optic each comprise at least one convex lens for focusing the radiation beam to the intermediate focal plane.

14. The assembly of claim 13, wherein the convex lens of the entrance optic and the exit optic each comprise singlets or doublets.

15. The assembly of claim 14, further comprising an exit pupil which receives the radiation beam from the exit optics and directs the radiation beam to the sensor unit.

16. The assembly of claim 15, wherein an inner diameter of the exit pupil is either matched or oversized to an entrance aperture of the sensor unit.

17. The assembly of claim 11, further comprising a housing for enclosing optical components, including one or more of, the entrance optics, the exit optics, the optical phase element, and the driving mechanism, to prevent contamination of the optical components.

18. A method for imparting wavefront aberrations to a radiation beam, the method comprising:

focusing a radiation beam to an intermediate focal plane through an afocal inverter;

providing a turbulence simulation device at the intermediate focal plane, the turbulence simulation device comprising:

an optical phase element for altering the optical phase of a radiation beam, the optical phase element comprising a plurality of active areas disposed on a surface of the phase element, the plurality of active areas comprising a plurality of variations for imparting wavefront aberrations to a radiation beam, thereby altering optical phase of the beam; and, a driving mechanism coupled to the optical phase element for transitioning the optical phase element between a plurality of positions, thereby exposing a different active area of the optical phase element to the radiation beam;

exposing the radiation beam to one of the active areas of the optical phase element to impart wavefront aberrations to the beam, to provide a radiation beam having a range of simulated turbulence;

converging the radiation beam having the range of simulated turbulence to a sensor unit for detecting the radiation beam, wherein the range of simulated turbulence to the radiation beam is captured within a single frame of the sensor unit under test.

\* \* \* \* \*

UNITED STATES PATENT AND TRADEMARK OFFICE
CERTIFICATE OF CORRECTION

PATENT NO. : 9,104,027 B2
APPLICATION NO. : 13/827202
DATED : August 11, 2015
INVENTOR(S) : John M. Hall Page 1 of 1

It is certified that error appears in the above-identified patent and that said Letters Patent is hereby corrected as shown below:

Title Page

Column 2, Item (57) ABSTRACT, Line 17, delete "a focal" and insert -- afocal --

In the Claims

Column 8, Line 31, Claim 6, after "the" delete "afocal"

Column 10, Line 4, Claim 18, after "an" delete "afocal"

Signed and Sealed this
Nineteenth Day of July, 2016

Michelle K. Lee
*Director of the United States Patent and Trademark Office*